(12) United States Patent
Aizawa

(10) Patent No.: US 12,556,105 B2
(45) Date of Patent: Feb. 17, 2026

(54) POWER CONVERTER APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kiyoshi Aizawa, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 186 days.

(21) Appl. No.: 18/558,437

(22) PCT Filed: Apr. 25, 2022

(86) PCT No.: PCT/JP2022/018728
§ 371 (c)(1),
(2) Date: Nov. 1, 2023

(87) PCT Pub. No.: WO2022/234784
PCT Pub. Date: Nov. 10, 2022

(65) Prior Publication Data
US 2024/0235405 A1    Jul. 11, 2024

(30) Foreign Application Priority Data

May 6, 2021 (JP) ................................ 2021-078397

(51) Int. Cl.
*H02M 3/337* (2006.01)
*H02M 1/00* (2006.01)
(Continued)

(52) U.S. Cl.
CPC ......... *H02M 3/3374* (2013.01); *H02M 1/007* (2021.05); *H02M 1/14* (2013.01); *H02M 3/33584* (2013.01); *H02M 3/337* (2013.01)

(58) Field of Classification Search
CPC ...... H02M 1/14; H02M 3/337; H02M 3/3374; H02M 3/33584
See application file for complete search history.

(56) References Cited

U.S. PATENT DOCUMENTS 5,138,249 A * 8/1992 Capel .................. H02M 3/1582
363/124
6,683,797 B2 * 1/2004 Zaitsu ............... H02M 3/33592
363/16

(Continued)

FOREIGN PATENT DOCUMENTS

| JP | H9-233698 A | 9/1997 |
| JP | 2008-206291 A | 9/2008 |
| JP | 2017-005773 A | 1/2017 |

OTHER PUBLICATIONS

International Search Report, Application No. PCT/JP2022/018728, mamiled Jul. 19, 2022. ISA/Japan Patent Office.

*Primary Examiner* — Gary L Laxton
(74) *Attorney, Agent, or Firm* — Honigman LLP

(57) ABSTRACT

In a power converter apparatus, a control unit can perform cyclical control that cyclically repeats switching control that switches operations between a third operation, a first operation, the third operation, and a second operation in that order. The control unit performs at least first control, in which a third switching element is switched between off, on and off states in that order during each first operation in the above cyclical control, the third switching element is switched between the off, on and off states in that order during each second operation, and the third switching element is kept in the off state during each third operation.

12 Claims, 5 Drawing Sheets

(51) Int. Cl.
*H02M 1/14* (2006.01)
*H02M 3/335* (2006.01)

(56) References Cited

U.S. PATENT DOCUMENTS

| | | | | |
|---|---|---|---|---|
| 6,728,118 B1 | * | 4/2004 | Chen | H02M 3/33592 |
| | | | | 363/24 |
| 2016/0352234 A1 | * | 12/2016 | Imai | H02M 3/158 |
| 2018/0287504 A1 | * | 10/2018 | Parsekar | H02M 3/335 |
| 2021/0006169 A1 | * | 1/2021 | Miyazaki | H02M 3/337 |

* cited by examiner

POWER CONVERTER APPARATUS

CROSS-REFERENCE TO RELATED APPLICATIONS

This application is the U.S. national stage of PCT/JP2022/018728 filed on Apr. 25, 2022, which claims priority of Japanese Patent Application No. JP 2021-078397 filed on May 6, 2021, the contents of which are incorporated herein.

TECHNICAL FIELD

The present disclosure relates to a power converter apparatus.

BACKGROUND

JP 2017-5773A cited below discloses a power converter apparatus. The power converter apparatus disclosed in JP 2017-5773A is a current-input push-pull DC-DC converter that includes a first switching element and a second switching element. This power converter apparatus further includes a third switching element for switching a conductive state between a DC power supply and a transformer, and a diode for electrically connecting a choke coil and a negative electrode side when electrical conduction between the DC power supply and the transformer is cut off. This power converter apparatus performs control so as to include a period where the first switching element, the second switching element, and the third switching element are all on and a period where one out of the first switching element and the second switching element is on and the other out of the first switching element and the second switching element and the third switching element are off.

The power converter apparatus (or "DC-DC converter") disclosed in JP 2017-5773A has a secondary battery connected to a pair of input terminals on one side and a capacitive load connected to a pair of output terminals on the other side. With this type of power converter apparatus, when power from the secondary battery is supplied to the capacitive load by the power converter apparatus (or "DC-DC converter") to charge the capacitive load, there is concern that if the voltage of the capacitive load is small, the current flowing through the choke coil will continuously rise. To address this problem, JP 2017-5773A includes a third switching element and a diode to provide a period where the current flowing through the choke coil is caused to fall. However, the control described in JP 2017-5773A on its own raises concerns about the ripple current flowing through the choke coil.

The present disclosure provides a technology for easily suppressing the ripple current flowing through the choke coil in a power converter apparatus equipped with a choke coil.

SUMMARY

A power converter apparatus according to one aspect of the present disclosure is a power converter apparatus for use in a power supply system including a direct current (DC) power supply, a capacitive load, a pair of first conductive paths that are paths through which a charging current for the capacitive load and a discharging current from the capacitive load flow, and a pair of second conductive paths that are paths through which power is supplied from the DC power supply and converts power between the pair of second conductive paths and the pair of first conductive paths, the power converter apparatus including: a transformer including a first coil portion, a second coil portion including a first winding and a second winding, and a center tap provided between the first winding and the second winding, wherein the first coil portion and the second coil portion are magnetically coupled; a converter circuit for performing a converting operation between the first coil portion and the pair of first conductive paths; and a switching circuit that performs a converting operation between the pair of second conductive paths and the second coil portion, wherein the switching circuit includes: a choke coil provided between one conductive path out of the pair of second conductive paths and the center tap; a first switching element provided between the other conductive path out of the pair of second conductive paths and a first end portion of the first winding at an opposite end to the center tap; a second switching element provided between the other conductive path and a second end portion of the second winding at an opposite end to the center tap; a third switching element that is provided between the one conductive path and the choke coil, permits current to flow to the choke coil via the one conductive path to the choke coil when the third switching element is in an on state, and cuts off a flow of current via the first conductive path to the choke coil when the third switching element is in an off state; a conductive portion capable of permitting current to flow in a first direction from the other conductive path toward an intermediate portion, which is between the choke coil and the third switching element, between the intermediate portion and the other conductive path; and a control unit for performing a first operation of turning on only the first switching element out of the first switching element and the second switching element, a second operation of turning on only the second switching element out of the first switching element and the second switching element, and a third operation of turning on both the first switching element and the second switching element, wherein while performing cyclical control that cyclically repeats switching control that switches the operation to the third operation, the first operation, the third operation, and the second operation in that order, the control unit performs at least first control that switches the third switching element to an off state, an on state, and the off state in that order during each first operation in the cyclical control, switches the third switching element to the off state, the on state, and the off state in that order during each second operation in the cyclical control, and keeps the third switching element in the off state during each third operation.

Advantageous Effects

The technology according to the present disclosure is capable of suppressing a ripple current flowing through the choke coil in a power converter apparatus equipped with a choke coil.

DETAILED DESCRIPTION OF PREFERRED EMBODIMENTS

Figure 1:
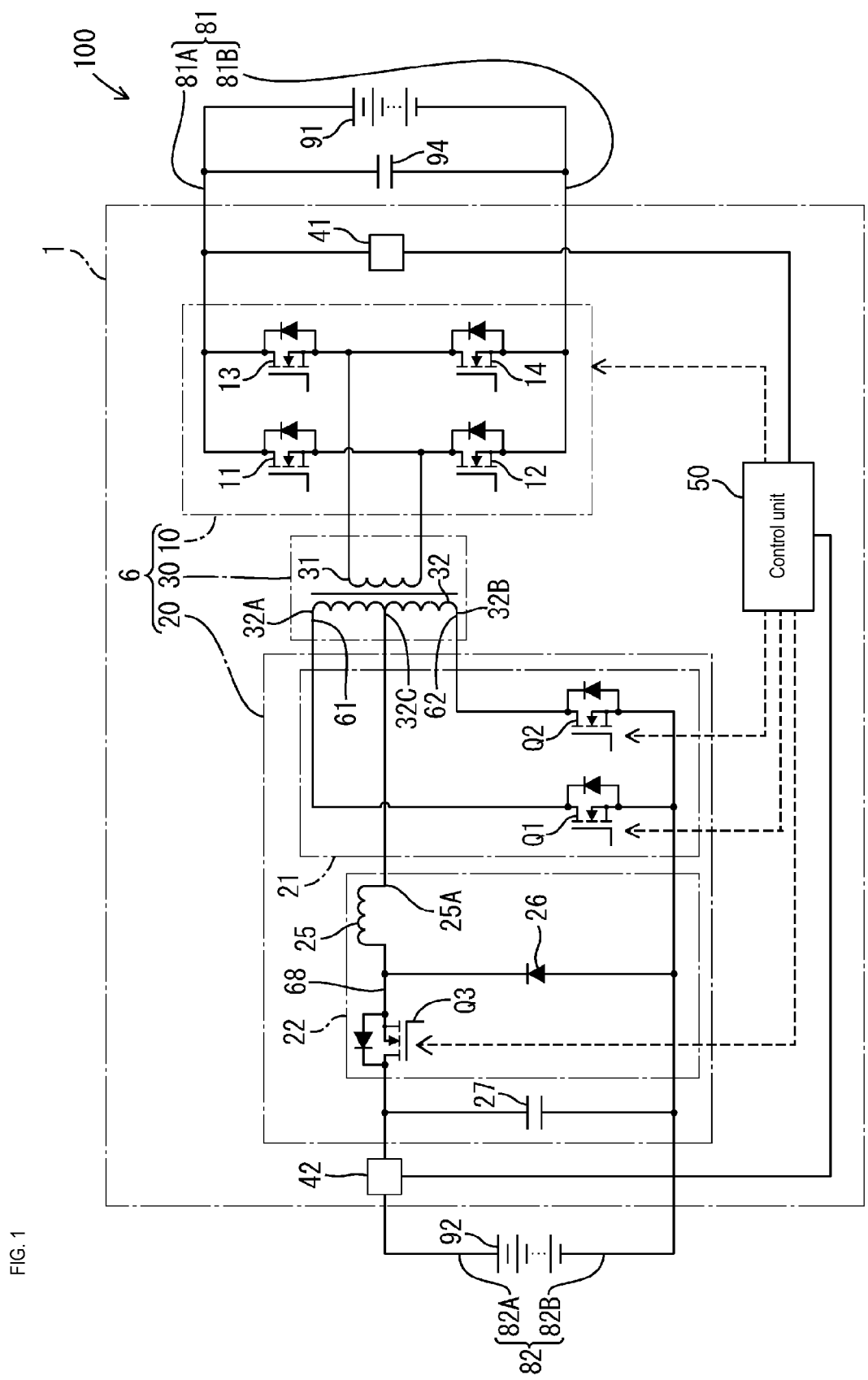
FIG. 1 is a block diagram schematically depicting a vehicle-mounted power supply system including a power converter apparatus according to a first embodiment of the present disclosure.

Embodiments of the present disclosure will first be listed and described in outline. Note that the features of the aspects indicated below may be freely combined within a range that is technically consistent.

In a first aspect, a power converter apparatus according to the present disclosure is a power converter apparatus for use in a power supply system including a direct current (DC) power supply, a capacitive load, a pair of first conductive paths that are paths through which a charging current for the capacitive load and a discharging current from the capacitive load flow, and a pair of second conductive paths that are paths through which power is supplied from the DC power supply, and converts power between the pair of second conductive paths and the pair of first conductive paths, the power converter apparatus including: a transformer including a first coil portion, a second coil portion including a first winding and a second winding, and a center tap provided between the first winding and the second winding, wherein the first coil portion and the second coil portion are magnetically coupled; a converter circuit for performing a converting operation between the first coil portion and the pair of first conductive paths; and a switching circuit that performs a converting operation between the pair of second conductive paths and the second coil portion, wherein the switching circuit includes: a choke coil provided between one conductive path out of the pair of second conductive paths and the center tap; a first switching element provided between the other conductive path out of the pair of second conductive paths and a first end portion of the first winding at an opposite end to the center tap; a second switching element provided between the other conductive path and a second end portion of the second winding at an opposite end to the center tap; a third switching element that is provided between the one conductive path and the choke coil, permits current to flow to the choke coil via the one conductive path to the choke coil when the third switching element is in an on state, and cuts off a flow of current via the first conductive path to the choke coil when the third switching element is in an off state; a conductive portion capable of permitting current to flow in a first direction from the other conductive path toward an intermediate portion, which is between the choke coil and the third switching element, between the intermediate portion and the other conductive path; and a control unit for performing a first operation of turning on only the first switching element out of the first switching element and the second switching element, a second operation of turning on only the second switching element out of the first switching element and the second switching element, and a third operation of turning on both the first switching element and the second switching element, wherein while performing cyclical control that cyclically repeats switching control that switches the operation to the third operation, the first operation, the third operation, and the second operation in that order, the control unit performs at least first control that switches the third switching element to an off state, an on state, and the off state in that order during each first operation in the cyclical control, switches the third switching element to the off state, the on state, and the off state in that order during each second operation in the cyclical control, and keeps the third switching element in the off state during each third operation.

In the power converter apparatus according to the first aspect, when power conversion is performed between the pair of second conductive paths and the pair of first conductive paths by cyclical control, the first control is performed to turn the third switching element on and off, which means that the current flowing through the choke coil can be suppressed. In addition, since the current is suppressed during both the first operation and the second operation by switching the third switching element to the off state, the on state, and the off state in that order, it is possible to prevent the current from excessively fluctuating. In addition, in the first control, the third switching element is kept in the off state during the third operation, which can further suppress the current flowing through the choke coil.

In a second aspect, a power converter apparatus is the power converter apparatus according to the first aspect with the following features. While performing the cyclical control, the control unit performs at least second control that switches the third switching element to the on state, the off state, and the on state in that order during each third operation in the cyclical control and keeps the third switching element in the on state during each first operation and each second operation in the cyclical control.

The power converter apparatus according to the second aspect can perform not only the first control but also the second control, and when performing each third operation during the second control, it is possible, by turning on and off the third switching element, to prevent excessive current from flowing in the choke coil.

In a third aspect, a power converter apparatus is the power converter apparatus according to the second aspect with the following features. The control unit performs the first control when a voltage between the pair of first conductive paths is equal to or less than a threshold voltage and switches from the first control to the second control when the voltage between the pair of first conductive paths has changed from a value equal to or less than the threshold voltage to a value that exceeds the threshold voltage.

The power converter apparatus according to the third aspect performs the first control in a state where the voltage between the pair of first conductive paths is less than the threshold voltage (that is, when the charging degree of the capacitive load is low) and can switch to the second control when the voltage between the first conductive paths has changed from equal to or less than the threshold voltage to above the threshold voltage (that is, when the charging degree of the capacitive load has increased to some degree). This power converter apparatus suppresses the current flowing through the choke coil in keeping with the voltage between the pair of first conductive paths and is suited to keeping the current stable.

In a fourth aspect, a power converter apparatus is the power converter apparatus according to any one of first to the third aspects described above with the following features. While performing the cyclical control, the control unit performs at least third control that keeps the third switching element in the on state during each first operation, during each second operation, and during each third operation in the cyclical control.

The power converter apparatus according to the fourth aspect can perform not only the first control but also the third control as necessary and therefore cancel current suppression achieved through on-off control of the third switching element.

In a fifth aspect, a power converter apparatus is the power converter apparatus according to the third aspect with the following features. While performing the cyclical control, the control unit described above performs third control that keeps the third switching element in the on state during each first operation, each second operation, and each third operation in the cyclical control. The control unit described above performs the second control when a voltage between the pair of first conductive paths exceeds the threshold voltage and is equal to or less than a second threshold voltage that is higher than the threshold voltage, and switches from the second control to the third control when the voltage between the pair of first conductive paths has changed from a value equal to or less than the second threshold voltage to a value that exceeds the second threshold voltage.

The power converter apparatus according to the fifth aspect can perform the first control when the charging degree of the capacitive load is low, can perform the second control when the charging degree of the capacitive load is a medium level, and can perform the third control when the charging degree of the capacitive load is high. When the charging degree of the capacitive load is a low or medium level, the power converter apparatus suppresses the current flowing through the choke coil in keeping with the voltage between the pair of first conductive paths and keeps the current stable. When the state of charge of the capacitive load is high, it is possible to cancel the suppression of current achieved by turning the third switching element on and off and switch to control that does not depend on the third switching element (that is, control achieved by the switching circuit and the converter circuit).

In a sixth aspect, a power converter apparatus is the power converter apparatus according to any one of the first to the fifth aspects with the following features. The switching circuit described above includes a chopper circuit including the third switching element, the conductive portion, and the choke coil. The control unit described above controls the chopper circuit to make a value of the current flowing through the first conductive path during the first control closer to a target current value.

The power converter apparatus according to the sixth aspect is capable of stabilizing the current flowing through the one conductive path during at least the first control, and can suppress the flow of excessive current through the choke coil and keep the current stable.

First Embodiment

Overview of Power Supply System

A power supply system 100 is configured as a vehicle-mounted power supply system to be installed in a vehicle. The power supply system 100 includes a first power storage unit 91, a second power storage unit 92, a pair of first conductive paths 81, a pair of second conductive paths 82, and the power converter apparatus 1.

The first power storage unit 91 is composed of a known battery, such as a lithium ion battery. The first power storage unit 91 functions as a main power storage apparatus. The first power storage unit 91 is not limited to a lithium ion battery, and may be another type of battery configured to allow charging and discharging. A high-potential-side terminal (or "positive electrode"), which is the terminal of the first power storage unit 91 with the highest potential, is electrically connected to one conductive path 81A. A low potential-side terminal (or "negative electrode"), which is the terminal of first power storage unit 91 with the lowest potential, is electrically connected to another conductive path 81B.

The pair of first conductive paths 81 are paths through which a charging current for a capacitive load 94 and a discharging current from the capacitive load 94 flow. The pair of first conductive paths 81 include the one conductive path 81A and the other conductive path 81B. The other conductive path 81B is electrically connected to ground, for example. In this specification, the one conductive path 81A is simply referred to as "the conductive path 81A" and the other conductive path 81B is simply referred to as the "conductive path 81B". As one example, the conductive path 81B is a conductive path that is kept at a reference potential (as one example, a ground potential of 0V).

A vehicle-mounted load may be electrically connected to the conductive paths 81A and 81B that construct the pair of first conductive paths 81 on the high voltage side so as to be supplied with DC power via the conductive paths 81A and 81B. In the example in FIG. 1, the capacitive load 94 is electrically connected to the pair of first conductive paths 81. During charging of the capacitive load 94, a charging current supplied to the capacitive load 94 flows through the pair of first conductive paths 81, meaning that the charging current is supplied to the capacitive load 94 via the pair of first conductive paths 81. During discharging of the capacitive load 94, a discharging current from the capacitive load 94 flows into the pair of first conductive paths 81. The capacitive load 94 may be a capacitor or a capacitive device that resembles a capacitor. A relay, a fuse, or the like may be provided between the capacitive load 94 and the first power storage unit 91.

In the power supply system 100 in FIG. 1, as one example, when a predetermined condition is satisfied (as one example, when a start switch of the vehicle is in an off state), the supplying of power from the first power storage unit 91 to the capacitive load 94 is cut off and electric charges that have accumulated in the capacitive load 94 are discharged via a discharge unit (not illustrated). Accordingly, as one example, when a predetermined condition is satisfied (for example, when the start switch of the vehicle is in an off state), a charging voltage for the capacitive load 94 (that is, the voltage between the conductive paths 81A and 81B) is kept close to 0V. On the other hand, in a state where the conductive paths 81A and 81B and the first power storage unit 91 become electrically connected due to an operation that turns on a relay or the like, the output voltage of the first power storage unit 91 is applied between the conductive paths 81A and 81B.

The second power storage unit 92 corresponds to one example of a DC power supply. The second power storage unit 92 is composed of a known battery, such as a lead acid battery. As one example, the second power storage unit 92 functions as a power storage apparatus for auxiliary equipment. The second power storage unit 92 is not limited to a lead acid battery, and may be another type of battery that can be charged and discharged. The high potential-side terminal (or "positive electrode"), which is the terminal of the second power storage unit 92 with the highest potential, is electrically connected to one conductive path 82A. The low potential-side terminal (or "negative electrode"), which is the terminal of the second power storage unit 92 with the lowest potential, is electrically connected to another conductive path 82B.

The output voltage (as one example, 12V) of the second power storage unit 92 is applied between the one conductive path 82A and the other conductive path 82B. The conductive path 82B is electrically connected to ground, for example. The output voltage when the second power storage unit 92 is fully charged is less than the output voltage when the first power storage unit 91 is fully charged. The one conductive path 82A and the other conductive path 82B construct a pair of second conductive paths 82 and form paths through which power is supplied from the second power storage unit 92 (which is a DC power supply). The one conductive path 82A is also referred to simply as the "conductive path 82A" and the other conductive path 82B is also referred to simply as the "conductive path 82B". As one example, the conductive path 82B is a conductive path that is kept at a reference potential (as one example, a ground potential of 0V).

Configuration of Power Converter Apparatus

The power converter apparatus 1 mainly includes a voltage converter unit 6, a control unit 50, and detector units 41 and 42. The power converter apparatus 1 is a bidirectional isolated DC-DC converter. The power converter apparatus 1 is an apparatus that performs power conversion between the pair of first conductive paths 81 and the pair of second conductive paths 82. The power converter apparatus 1 is capable of at least a step-up operation that boosts the DC voltage applied between the conductive paths 82A and 82B so as to apply a higher DC voltage than the DC voltage between the conductive paths 82A and 82B to the conductive paths 81A and 81B. In addition, the power converter apparatus 1 is capable of a step-down operation that lowers the DC voltage applied between the conductive paths 81A and 81B so as to apply a lower DC voltage than the DC voltage between the conductive paths 81A and 81B to the conductive paths 82A and 82B.

The voltage converter unit 6 has a function of performing, according to a PWM (Pulse Width Modulation) signal provided from the control unit 50, a step-up operation that steps up the DC voltage applied between the conductive paths 82A and 82B and applies the resulting DC voltage between the conductive paths 81A and 81B. Note that in this specification, pulse width modulation is also referred to simply as "PWM". The voltage converter unit 6 also has a function of performing a step-down operation under the control of the control unit 50 to step down the DC voltage applied between the conductive paths 81A and 81B and apply the resulting DC voltage between the conductive paths 82A and 82B. The voltage converter unit 6 mainly includes a converter circuit 10, a switching circuit 20, and a transformer 30.

As depicted in FIG. 1, the transformer 30 includes a first coil portion 31 and a second coil portion 32. The first coil portion 31 is a coil in which the number of turns is a first value N1. The second coil portion 32 is a coil that is magnetically coupled to the first coil portion 31. The second coil portion 32 is a center-tapped coil, and includes a first winding 32A, a second winding 32B, and a center tap 32C provided between the first winding 32A and the second winding 32B. The first winding 32A and the second winding 32B that construct the second coil portion 32 are magnetically coupled to the first coil portion 31. The first winding 32A and the second winding 32B are coils in which the number of turns is a second value N2. The center tap 32C is an intermediate portion at which the potential is the same potential as one end of the first winding 32A and one end of the second winding 32B. The turns ratio N of the transformer 30 is N1/N2=N.

The converter circuit 10 depicted in FIG. 1 is a circuit that performs a converting operation between the first coil portion 31 and the pair of first conductive paths 81. In the example in FIG. 1, the converter circuit 10 is constructed as a full bridge circuit and includes a plurality of switching elements 11, 12, 13 and 14. The switching elements 11, 12, 13 and 14 are semiconductor switching elements. The switching elements 11 and 12 are connected in series between the conductive path 81A and the conductive path 81B. The switching elements 13 and 14 are connected in series between the conductive path 81A and the conductive path 81B. One end of the coil forming the first coil portion 31 is electrically connected to a junction between the switching elements 11 and 12, and the other end of the coil forming the first coil portion 31 is electrically connected to a junction between the switching elements 13 and 14. The converter circuit 10 can perform a converting operation that converts the DC voltage applied between the conductive path 81A and the conductive path 81B to generate an AC voltage in the first coil portion 31. In addition, the converter circuit 10 can also perform a converting operation that converts an AC voltage generated in the first coil portion 31 to produce a DC voltage applied between the conductive path 81A and the conductive path 81B.

The switching circuit 20 depicted in FIG. 1 is a circuit that performs a converting operation between the pair of second conductive paths 82 and the second coil portion 32. In the example in FIG. 1, the switching circuit 20 includes a first switching element Q1, a second switching element Q2, a third switching element Q3, a choke coil 25, a diode 26, a capacitor 27, and the like. The first switching element Q1, the second switching element Q2, and the third switching element Q3 are semiconductor switching elements. In FIG. 1, MOSFETs (Metal-Oxide-Semiconductor Field Effect Transistors) are depicted as the switching elements 11, 12, 13, 14, Q1, Q2, and Q3.

In the switching circuit 20, the first switching element Q1 and the second switching element Q2 construct a push-pull circuit 21. The push-pull circuit 21 performs a first converting operation that converts the voltage applied between the end portion 25A (that is, the center tap 32C-side end portion) of the choke coil 25 and the conductive path 82B to generate an AC voltage in the first winding 32A and the second winding 32B. In addition, the push-pull circuit 21 may also perform a second converting operation that converts an AC voltage generated in the first winding 32A and the second winding 32B and applies the resulting voltage between the end portion 25A (that is, the center tap 32C-side end portion) of the choke coil 25 and the conductive path 82B.

The first switching element Q1 is provided between the conductive path 82B (or "other conductive path") out of the pair of second conductive paths 82 and the other end (or a first end portion 61 at the opposite end to the center tap 32C) of the first winding 32A. One end of the first switching element Q1 is electrically connected to an end portion (or first end portion 61) of the first winding 32A. The other end of the first switching element Q1 is electrically connected to the conductive path 82B. When the first switching element Q1 is on, current is permitted to flow from the first winding 32A to the conductive path 82B, and when the first switching element Q1 is off, the flow of current from the first winding 32A to the conductive path 82B is cut off.

The second switching element Q2 is provided between the conductive path 82B (or "other conductive path") out of the pair of second conductive paths 82 and the other end (that is, a second end portion 62 at the opposite end to the center tap 32C) of the second winding 32B. One end of the second switching element Q2 is electrically connected to an end portion (the second end portion 62) of the second winding 32B. The other end of the second switching element Q2 is electrically connected to the conductive path 82B. When the second switching element Q2 is on, current is permitted to flow from the second winding 32B to the conductive path 82B, and when the second switching element Q2 is off, the flow of current from the second winding 32B to the conductive path 82B is cut off.

In the example in FIG. 1, the choke coil 25 is provided between the conductive path 82A (or "one conductive path") out of the pair of second conductive paths 82 and the center tap 32C. When the power converter apparatus 1 performs the step-down operation mentioned earlier, that is, when the push-pull circuit 21 performs the second converting operation described above, the choke coil 25 constructs a smoothing circuit for generating a DC voltage to be applied between the conductive paths 82A and 82B. One end of the first winding 32A and one end of the second winding 32B are electrically connected to the center tap 32C and are electrically connected to the end portion 25A of the choke coil 25.

The third switching element Q3 is provided between the conductive path 82A (or "one conductive path") and the choke coil 25, and is an element that switches the current conduction state between the conductive path 82A and the choke coil 25 between a permitted state where conduction is permitted and a cut off state. When the third switching element Q3 is in the on state, current is permitted to flow from the conductive path 82A side to the choke coil 25 side via the conductive path 82A (or "one conductive path"). When the third switching element Q3 is in the off state, the flow of current from the conductive path 82A side to the choke coil 25 side via the conductive path 82A (or "one conductive path") is cut off. In the example in FIG. 1, the conductive path 82A is a conductive path that is electrically connected at one end to the positive electrode of the second power storage unit 92 and is electrically connected at the other end to the third switching element Q3 with the detector unit 42 interposed in between.

The diode 26 corresponds to one example of a conductive portion. The diode 26 is provided between an intermediate portion 68, which is between the choke coil 25 and the third switching element Q3, and the conductive path 82B (or "other conductive path"). In the example in FIG. 1, the anode of the diode 26 is electrically connected to the conductive path 82B and the cathode of the diode 26 is electrically connected to the conductive path 82B. The diode 26 permits current to flow in a first direction from the intermediate portion 68 (or "other conductive path") side toward the intermediate portion 68 and restricts the flow of current in a second direction that is opposite to the first direction.

In the example in FIG. 1, a chopper circuit 22 is constructed by the third switching element Q3, the diode 26, and the choke coil 25. This chopper circuit 22 is controlled by an on/off signal (for example, a PWM signal) provided to the third switching element Q3.

The capacitor 27 has one end electrically connected to the conductive path 82A and another end electrically connected to the conductive path 82B. The capacitor 27 may function as a smoothing capacitor.

As one example, the control unit 50 is configured as an information processing apparatus with a computational function and an information processing function. The control unit 50 may be configured as a microcomputer, or may be configured as another information processing apparatus. The control unit 50 may be realized by a single information processing apparatus, or may be realized by a plurality of information processing apparatuses. The control unit 50 has a function of controlling the voltage converter unit 6. The control unit 50 controls the converter circuit 10 by providing control signals to the switching elements 11, 12, 13, and 14. The control unit 50 controls the switching circuit 20 by providing control signals to the first switching element Q1, the second switching element Q2, and the third switching element Q3.

The detector unit 41 functions as a voltage detector unit and inputs a value indicating the voltage between the pair of first conductive paths 81 into the control unit 50. The detector unit 41 may input the voltage value between the pair of first conductive paths 81 into the control unit 50 or may input a value produced by dividing the voltage between the pair of first conductive paths 81 by a predetermined voltage dividing ratio into the control unit 50. The control unit 50 specifies the value of the voltage Vc between the pair of first conductive paths 81 based on the value provided from the detector unit 41.

The detector unit 42 functions as a current detector unit, detects the value of the current flowing through one path (in FIG. 1, the conductive path 82A) out of the pair of second conductive paths 82 and inputs the detected value into the control unit 50. In the example in FIG. 1, the detector unit 42 functions as a known current sensor and provides the control unit 50 with information specifying the value of the current flowing through the conductive path 82A. The control unit 50 specifies a current Iin flowing from the conductive path 82A into the choke coil 25 based on the value provided from the detector unit 42.

Step-Down Operation of Power Converter Apparatus

The power converter apparatus 1 functions as a full-bridge isolated DC-DC converter. When the power converter apparatus 1 performs a first voltage converting operation (that is, a step-down operation), the converter circuit 10 converts the DC voltage applied between the conductive paths 81A and 81B to produce an AC voltage in the first coil portion 31. In this case, an AC voltage corresponding to the AC voltage generated in the first coil portion 31 is generated in the second coil portion 32. When the power converter 1 performs the first voltage converting operation (that is, the step-down operation), the switching circuit 20 functions as a rectifier circuit, and rectifies the AC voltage generated in the second coil portion 32 into a DC voltage which is applied between the conductive paths 81A and 81B.

The control unit 50 can cause the voltage conversion unit 6 to perform a step-down operation according to a known control method used in a full-bridge isolated DC-DC converter. When the voltage converter unit 6 is to perform the step-down operation described above, the control unit 50 alternately performs an operation that turns on the switching elements 11 and 14 and turns off the switching elements 12 and 13 and an operation that turns off the switching elements 11 and 14 and turns on the switching elements 12 and 13. Due to the control unit 50 controlling the switching elements 11, 12, 13, and 14 in this way, the converter circuit 10 converts the DC voltage applied between the conductive paths 81A and 81B into an AC voltage and produces an AC voltage in the first coil portion 31. As a result, an AC voltage in keeping with the turns ratio N is generated in the second coil portion 32 that is magnetically coupled to the first coil portion 31. During a step-down operation, the switching circuit 20 rectifies the AC voltage generated in the second coil portion 32 to convert this AC voltage into a DC voltage, and applies this DC voltage between the conductive paths 82A and 82B. The choke coil 25 functions so as to smooth the DC voltage applied to the conductive paths 82A and 82B during the step-down operation described above.

Step-Up Operation of Power Converter Apparatus

When the power converter apparatus 1 performs a second voltage converting operation (a step-up operation), the switching circuit 20 functions as a circuit that performs a push-pull switching operation and converts a DC voltage applied between the conductive paths 82A and 82B into an AC voltage and causes the second coil portion 32 to generate an AC voltage. In the transformer 30, when an AC voltage is generated in this way in the second coil portion 32, an AC voltage in keeping with the turn ratio N is generated in the first coil portion 31. When the power converter apparatus 1 performs the second voltage converting operation (a step-up operation) described above, the converter circuit 10 functions as a rectifier circuit that rectifies the AC voltage generated in the first coil portion 31 to convert the AC voltage into a DC voltage that is applied between the conductive paths 81A and 81B.

The control unit 50 is capable of outputting on signals and off signals to the first switching element Q1, the second switching element Q2, and the third switching element Q3 to switch the first switching element Q1, the second switching element Q2, and the third switching element Q3 between the on and off states. When the control unit 50 has the voltage converter unit 6 perform the step-up operation, the control unit 50 performs a first operation, a second operation, and a third operation. The first operation is an operation that turns on only the first switching element Q1 out of the first switching element Q1 and the second switching element Q2. The second operation is an operation that turns on only the second switching element Q2 out of the first switching element Q1 and the second switching element Q2. The third operation is an operation that turns on both the first switching element Q1 and the second switching element Q2.

Figure 2:
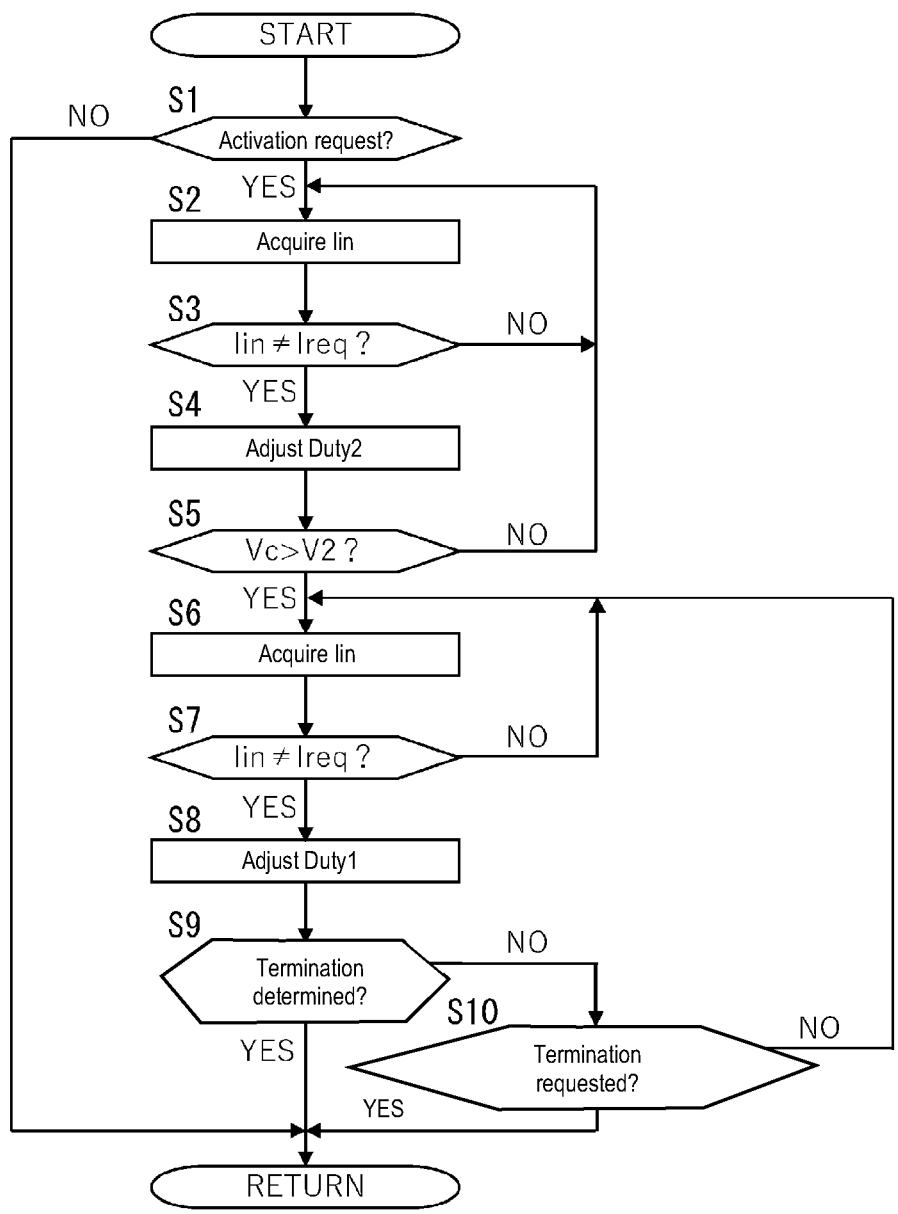
FIG. 2 is a flowchart depicting the flow of control performed by the power converter apparatus in FIG. 1.

FIG. 2 is a flowchart illustrating the flow of control when the control unit 50 causes the voltage converter unit 6 to perform a step-up operation. The control unit 50 starts the operation of the voltage converter unit 6 when a predetermined start condition is satisfied. In the example in FIG. 2, "the start condition is satisfied" when "there is an external activation request to the control unit 50". Note that the predetermined start condition is not limited to this example. As another example, "the start condition is satisfied" may be when the vehicle is in a startup state, or "the start condition is satisfied" may be when the control unit 50 is powered on.

When the control unit 50 determines in the determination processing of step S1 that a predetermined start condition is satisfied, a determination of "yes" is given in step S1, and in step S2 the value Iin of the current flowing through the conductive path 82A is checked. The control unit 50 specifies this current value Iin based on a value inputted from the detector unit 42.

After step S2, in step S3, the control unit 50 determines whether the current value Iin does not match a target current value (or "required current value") Ireq, and when the current value Iin is equal to the target current value (required current value) Ireq, a determination of "no" is given in step S3 and the processing returns to step S2. When the control unit 50 determines in step S3 that the current value Iin does not match the target current value (required current value) Ireq, a determination of "yes" is given in step S3 and in step S4, the duty (or "second duty Duty2") of the PWM signal provided to the third switching element Q3 is adjusted. In step S4, the second duty Duty2 is increased or decreased so as to perform a feedback operation that brings the current value Iin closer to the target current value Ireq. After step S4, in step S5, the control unit 50 determines whether the voltage Vc between the pair of first conductive paths 81 exceeds a second threshold voltage V2, and when the voltage Vc is equal to or less than the second threshold voltage V2, the processing returns to step S2. In this way, after a determination of "yes" is given in step S1, the control unit 50 performs feedback control that adjusts the second duty Duty2 so as to keep the current value Iin at the target current value Ireq until the voltage Vc exceeds the second threshold voltage V2.

In this way, the control unit 50 adjusts the duty (the second duty Duty2) of the PWM signal provided to the third switching element Q3 so as to keep the input current Iin inputted into the chopper circuit 22 constant until the voltage Vc exceeds the second threshold voltage V2. Note that after a determination of "yes" has been given in step S1, the control unit 50 sets the duty of each PWM signal provided to the first switching element Q1 and the second switching element Q2 at a predetermined minimum duty until the voltage Vc exceeds the second threshold voltage V2. Note that when the control unit 50 performs a step-up operation, since the duty of the PWM signals provided to the first switching element Q1 and the second switching element Q2 is adjusted to become greater than 0.5, the minimum duty described above is a value above 0.5.

Figure 3:
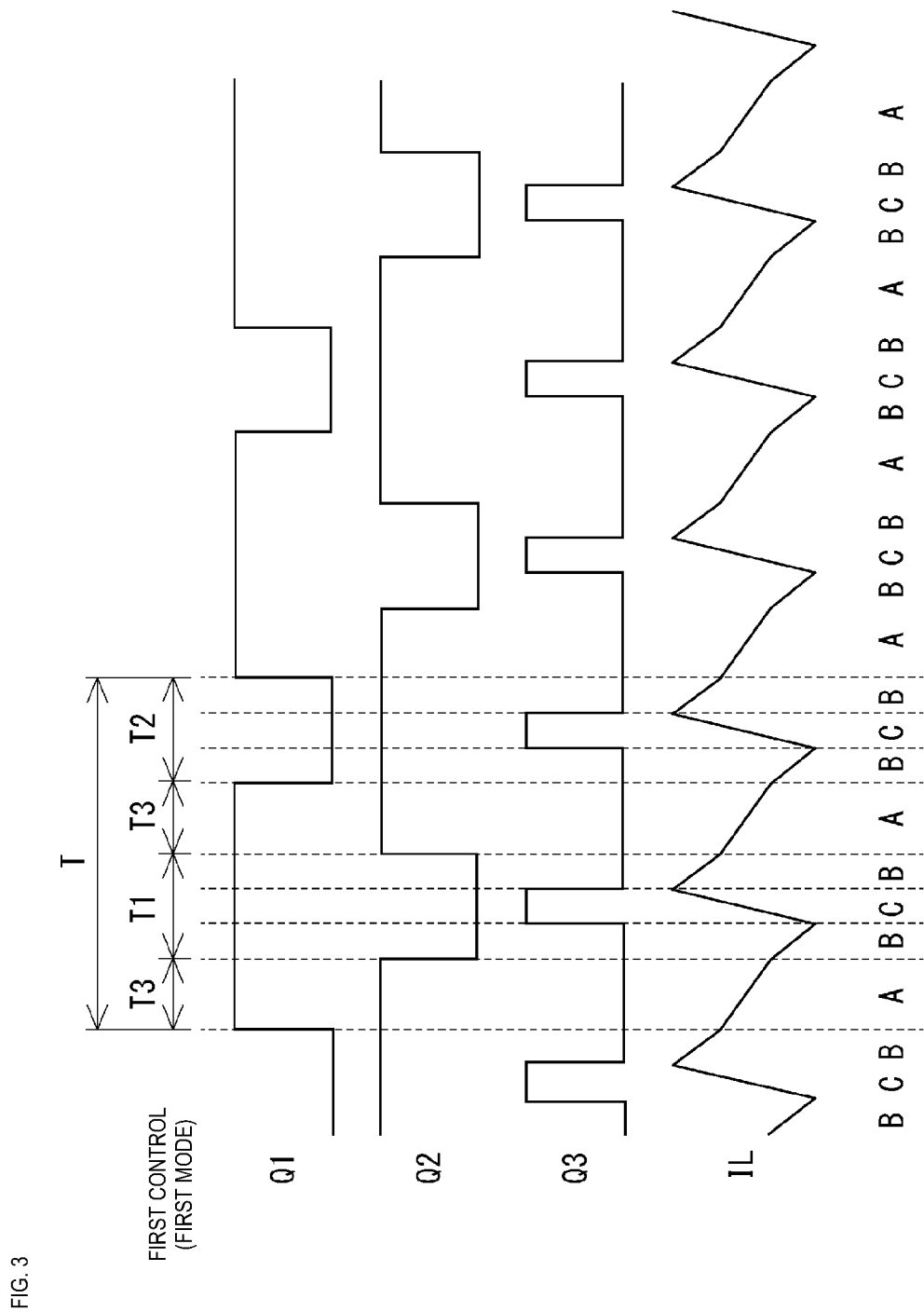
FIG. 3 is a timing chart depicting the states of each switching element and a current that flows through a choke coil during first control.
Figure 4:
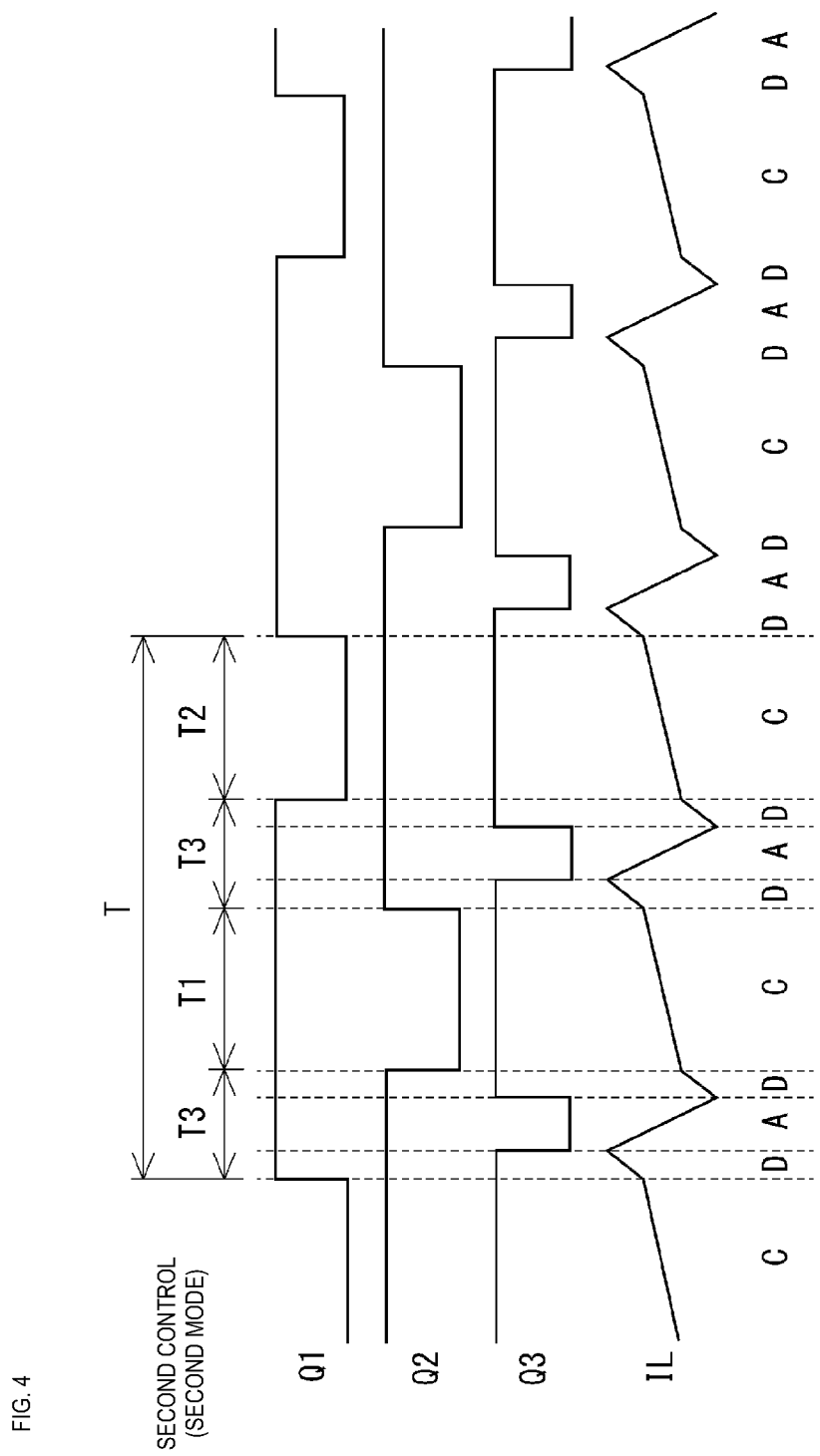
FIG. 4 is a timing chart depicting the states of each switching element and a current that flows through the choke coil during second control.
Figure 5:
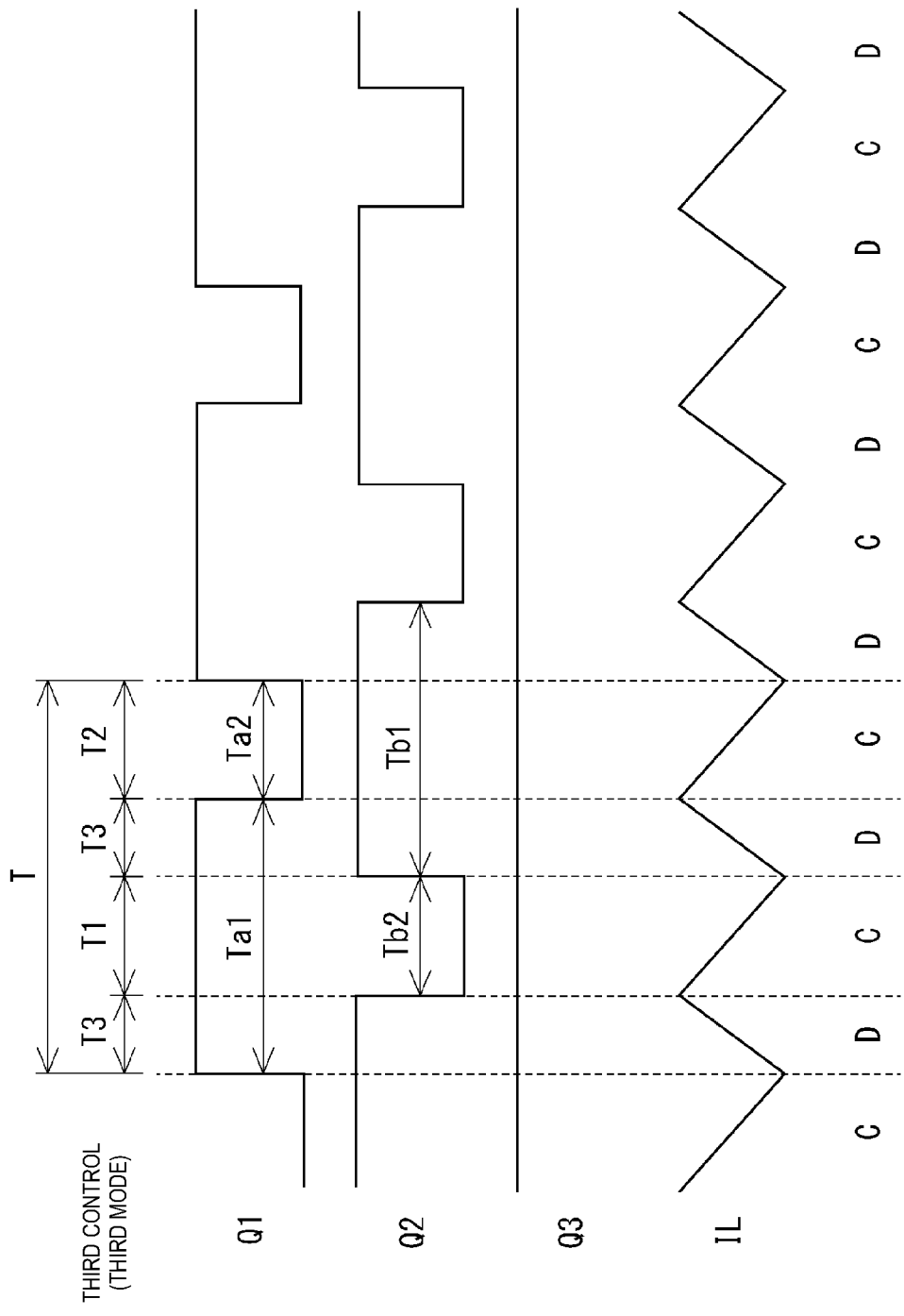
FIG. 5 is a timing chart depicting the states of each switching element and a current that flows through the choke coil during third control.

When performing the step-up operation described above, as depicted in FIGS. 3 to 5, the control unit 50 cyclically repeats switching control to switch the operation to the third operation, the first operation, the third operation, and the second operation in that order. In the examples in FIGS. 3 to 5, one cycle T is the period from a rise in the on signal applied to the first switching element Q1 to the end of an off signal immediately following this on signal (that is, a rise in the next on signal). In FIGS. 3 to 5, each period of the first operation is indicated as "T1", each period of the second operation is indicated as "T2", and each period of the third operation is indicated as "T3". In FIG. 5, the period of an on signal applied to the first switching element Q1 is indicated as "Ta1", and the period of an off signal applied to the first switching element Q1 is indicated as "Ta2". The period of an on signal applied to the second switching element Q2 is indicated as "Tb1" and the period of an off signal applied to the second switching element Q2 is indicated as "Tb2". In FIGS. 3 to 5 "IL" is the current flowing through the choke coil 25.

As depicted in FIGS. 3 to 5, when a step-up operation is performed, the PWM signals provided to both the first switching element Q1 and the second switching element Q2 have the same cycle T and the same duty (the first duty Duty1). However, the timing is adjusted so that an intermediate point in the period Ta1 of an on signal for the first switching element Q1 (a point when half the period Ta1 has elapsed) and an intermediate point in the period Tb2 of an off signal for the second switching element Q2 (that is, a point when half the period Tb2 has elapsed) match. In the same way, the timing is adjusted so that an intermediate point in the period Ta2 of the off signal of the first switching element Q1 (that is, a point when half the period Ta2 has elapsed) and an intermediate point in the period Tb1 of the on signal of the second switching element Q2 (that is, a point when half the period Tb1 has elapsed) match.

During iterations of the processing in steps S2 to S5, as depicted in FIGS. 3 and 4, the duty (or "second duty Duty2") of the PWM signal (or "second PWM signal") provided to the third switching element Q3 is adjusted. The period of the PWM signal provided to the third switching element Q3 is T/2. An intermediate point in the on signal of the PWM signal provided to the third switching element Q3 (that is, a point when half the period from a rise to a fall in the on signal has elapsed, starting from a rise in the on signal) is an intermediate point in the period Ta1 and the period Tb1. When the PWM signal provided to the third switching element Q3 has been adjusted so that the intermediate point of a given ON signal is an intermediate point in the period Ta1, the intermediate point in the next on signal is adjusted to an intermediate point of the period Tb1 that comes after the period Ta1.

When, during an iteration of the processing in steps S2 to S5 in FIG. 2, the voltage Vc (that is, the voltage between the first conductive paths 81) is equal to or less than the first threshold voltage V1, the control unit 50 performs the first control as depicted in FIG. 3, and when the voltage Vc (that is, the voltage between the first conductive paths 81) changes from equal to or less than the first threshold voltage V1 to a value that exceeds the first threshold voltage V1, the control unit 50 switches from the first control to the second control. After this, the control unit 50 performs the second control as depicted in FIG. 4 during a period where the voltage Vc exceeds the first threshold voltage V1 and is equal to or less than the second threshold voltage V2. The first threshold voltage V1 is set at the value of a voltage Vc at a time when the length of the on time of the PWM signal (or "second PWM signal") provided to the third switching element Q3, following a gradual increase in the on period of the PWM signal (or "second PWM signal") during the first control, matches the length of the off time of the PWM signal (or "first PWM signal") applied to the first switching element Q1 and the second switching element Q2.

In the first control depicted in FIG. 3, during each first operation (the period T1) in the cyclical control described above, the third switching element Q3 is switched to the off state, the on state, and the off state in that order, during each second operation (the period T2) in the cyclical control, the third switching element Q3 is switched to the off state, the on state, and the off state in that order, and during each third operation (the period T3), the third switching element Q3 is kept in the off state.

In the second control depicted in FIG. 4, during each third operation (the period T3) in the cyclical control described above, the control unit 50 switches the third switching element Q3 to the on state, the off state, and the on state in that order, and during each first operation (the period T1) and each second operation (the period T2) in the cyclical control described above, keeps the third switching element Q3 in the on state.

As depicted in FIG. 2, when the control unit 50 has determined in step S5 that the voltage Vc between the pair of first conductive paths 81 exceeds the second threshold voltage V2, in step S6 the value Iin of the current flowing through the conductive path 82A is checked. The second threshold voltage V2 corresponds to the voltage Vc when the duty has changed to become 1 (that is, the off period is 0) following a gradual increase in the on period during the second control as depicted in FIG. 4. The second threshold voltage V2 may be provided in advance as a predetermined value, and when the duty of the second PWM signal becomes 1, a determination of "yes" may be given in step S5.

After step S6, in step S7, the control unit 50 determines whether the current value Iin does not match the target current value (required current value) Ireq, and when the current value Iin is equal to the target current value (required current value) Ireq, a determination of "no" is given in step S7 and the processing returns to step S6. When it has been determined in step S7 that the current value Iin does not match the target current value (required current value) Ireq, the control unit 50 gives a determination of "yes" in step S7 and in step S8 adjusts the duty (or "first duty Duty1") of the PWM signals provided to the first switching element Q1 and the second switching element Q2. In step S8, the first duty Duty1 is increased or decreased so as to perform a feedback operation that brings the current value Iin closer to the target current value Ireq. After step S8, if a predetermined termination determination has been made (a determination of "yes" in step S9) or if there has been a predetermined termination request (a determination of "yes" in step S10), the control unit 50 ends the control in FIG. 2, otherwise returns the processing to step S6. In other words, while performing the cyclical control described above, the control unit 50 repeats feedback control to adjust the first duty Duty1 so as to bring the current value Iin closer to the target current value Ireq until there is a determination to terminate or a termination request.

After a determination of "yes" is given in step S5, the control unit 50 iterates the processing in steps S6, S7, and S8 until a determination of "yes" is given in step S9 or a determination of "yes" is given in step S10. The control that iteratively performs steps S6, S7, and S8 in this way is the "third control". As depicted in FIG. 5, the third control is control that performs the cyclical control described above while keeping the third switching element Q3 in the on state during each first operation (the period T1), each second operation (the period T2), and during each third operation (the period T3) of such cyclical control.

In the example in FIG. 2, the control unit 50 performs the second control when the voltage Vc between the pair of first conductive paths 81 is a value that exceeds the first threshold voltage V1 and is equal to or less than the second threshold voltage V2 and switches from the second control to the third control when the voltage Vc between the pair of first conductive paths 81 has changed from being the second threshold voltage V2 or less to a value that exceeds the second threshold voltage V2. The second threshold voltage V2 is a higher value than the first threshold voltage V1.

Example Effects

The following description relates to the effects of the first embodiment.

When performing power conversion between the pair of second conductive paths 82 and the pair of first conductive paths 81 through cyclical control (in the example described above, when the step-up operation is performed), the power converter apparatus 1 performs the first control so as to turn the third switching element Q3 on and off as depicted in FIG. 3. Accordingly, the power converter apparatus 1 can suppress the current flowing through the choke coil 25. The power converter apparatus 1 also suppresses the current during both the first operation and the second operation by switching the third switching element Q3 off, on, and off in that order, and can thereby prevent the current from excessively fluctuating. In addition, in the first control, the third switching element Q3 is kept off during the third operation, which further suppresses the current flowing through the choke coil 25.

As depicted in FIG. 4, the power converter apparatus 1 is capable of performing not only the first control but also the second control. During each third operation performed during the second control, the third switching element Q3 is turned on and off, which prevents excessive current from flowing in the choke coil 25.

The power converter apparatus 1 performs the first control when the voltage Vc between the pair of first conductive paths 81 is equal to or less than the threshold voltage V1 (that is, when the charging degree of the capacitive load 94 is low). After this, when the voltage Vc between the pair of first conductive paths 81 has changed from the threshold voltage V1 or less to a value that exceeds the threshold voltage V1 (that is, when the charging degree of the capacitive load 94 has increased to some degree), the power converter apparatus 1 can switch from the first control to the second control. This power converter apparatus 1 suppresses the current flowing through the choke coil 25 in keeping with the voltage between the pair of first conductive paths 81 and is suited to keeping the current stable.

As depicted in FIG. 5, the power converter apparatus 1 performs not only the first control but also the third control as necessary and therefore cancel the suppression of current achieved through on-off control of the third switching element Q3.

The power converter apparatus 1 can perform the first control when the charging degree of the capacitive load 94 is low, can perform the second control when the charging degree of the capacitive load 94 is a medium level, and can perform the third control when the charging degree of the capacitive load 94 is high. When the capacitive load 94 is in a state where the charging degree is a low or medium level, the power converter apparatus 1 suppresses the current flowing through the choke coil 25 in keeping with the voltage between the pair of first conductive paths 81 and keeps the current stable. When the charging degree of the capacitive load 94 is high, it is possible to cancel the suppression of current achieved by turning the third switching element Q3 on and off and switch to control that does not depend on the third switching element Q3 (that is, control achieved by the switching circuit 20 and the converter circuit 10).

Other Embodiments

The present disclosure is not limited to the embodiments indicated in the above description and accompanying drawings, and as examples, the features of the embodiments described above and below can be combined within a range where this is technically consistent. Features of the embodiments described above or below that have not been clearly established as being essential may be omitted. The embodiments described above may also be modified as follows.

Although the diode 26 has been given as an example of a "conductive portion" in the description of the first embodiment, the present disclosure is not limited to this example. As one example, a semiconductor switching element such as a FET may be used in place of the diode 26, and a synchronous rectification type chopper circuit may be configured by the third switching element Q3, the FET, and the choke coil 25 during the first operation or the third operation.

All features of the embodiments disclosed here are exemplary and should not be regarded as limitations on the present disclosure. The scope of the present disclosure is indicated by the range of the patent claims, not the embodiments described above, and is intended to include all changes within the meaning and scope of the patent claims and their equivalents.

The invention claimed is:

1. A power converter apparatus for use in a power supply system including a direct current (DC) power supply, a capacitive load, a pair of first conductive paths through which a charging current for the capacitive load and a discharging current from the capacitive load flow, and a pair of second conductive paths through which power is supplied from the DC power supply and converts power between the pair of second conductive paths and the pair of first conductive paths, the power converter apparatus comprising:
a transformer including a first coil portion, a second coil portion including a first winding and a second winding, and a center tap provided between the first winding and the second winding, wherein the first coil portion and the second coil portion are magnetically coupled;
a converter circuit for performing a converting operation between the first coil portion and the pair of first conductive paths; and
a switching circuit that performs a converting operation between the pair of second conductive paths and the second coil portion,
wherein the switching circuit includes:
a choke coil provided between one of the pair of second conductive paths and the center tap;
a first switching element provided between the other of the pair of second conductive paths and a first end portion of the first winding at an opposite end to the center tap;
a second switching element provided between the other of the pair of second conductive paths and a second end portion of the second winding at an opposite end to the center tap;
a third switching element that is provided between the one conductive path and the choke coil, permits current to flow to the choke coil via the one of the pair of second conductive paths to the choke coil when the third switching element is in an on state, and cuts off a flow of current via a corresponding one of pair of first conductive paths to the choke coil when the third switching element is in an off state;
a conductive portion capable of permitting current to flow in a first direction from the other conductive path toward an intermediate portion, which is between the choke coil and the third switching element, between the intermediate portion and the other conductive path; and
a control unit for performing a first operation of turning on only the first switching element out of the first switching element and the second switching element, a second operation of turning on only the second switching element out of the first switching element and the second switching element, and a third operation of turning on both the first switching element and the second switching element,
wherein while performing cyclical control that cyclically repeats switching control that switches an operation in an order of the third operation, the first operation, the third operation, and the second operation, the control unit performs at least a first control that switches the third switching element in an order of an off state, an on state, and the off state during each first operation in the cyclical control, switches the third switching element in the order of the off state, the on state, and the off state during each second operation in the cyclical control, and keeps the third switching element in the off state during each of the third operation.

2. The power converter apparatus according to claim 1, wherein while performing the cyclical control, the control unit performs at least second control that switches the third switching element to the on state, the off state, and the on state in that order during each of the third operation in the cyclical control and keeps the third switching element in the on state during each of the first operation and each of the second operation in the cyclical control.

3. The power converter apparatus according to claim 2, wherein the control unit performs the first control when a voltage between the pair of first conductive paths is equal to or less than a threshold voltage and switches from the first control to the second control when the voltage between the pair of first conductive paths has changed from a first value that is equal to or less than the threshold voltage to a second value that exceeds the threshold voltage.

4. The power converter apparatus according to claim 1, wherein while performing the cyclical control, the control unit performs at least third control that keeps the third switching element in the on state during each first operation, during each second operation, and during each third operation in the cyclical control.

5. The power converter apparatus according to claim 3,
wherein while performing the cyclical control, the control unit performs the third control that keeps the third switching element in the on state during each first operation, each second operation, and each third operation in the cyclical control, and
the control unit performs the second control when the voltage between the pair of first conductive paths exceeds the threshold voltage and is equal to or less than the second threshold voltage that is higher than the threshold voltage and switches from the second control to the third control when the voltage between the pair of first conductive paths has changed from a third value equal to or less than the second threshold voltage to a fourth value that exceeds the second threshold voltage.

6. The power converter apparatus according to claim 1,
wherein the switching circuit includes a chopper circuit including the third switching element, the conductive portion, and the choke coil, and
the control unit controls the chopper circuit to make a value of a current flowing through the pair of first conductive paths during the first control closer to a target current value.

7. The power converter apparatus according to claim 2, wherein while performing the cyclical control, the control unit performs at least third the control that keeps the third switching element in the on state during each first operation, during each second operation, and during each third operation in the cyclical control.

8. The power converter apparatus according to claim 3, wherein while performing the cyclical control, the control unit performs at least third the control that keeps the third switching element in the on state during each first operation, during each second operation, and during each third operation in the cyclical control.

9. The power converter apparatus according to claim 2,
wherein the switching circuit includes a chopper circuit including the third switching element, the conductive portion, and the choke coil, and
the control unit controls the chopper circuit to make a value of a current flowing through the pair of first conductive paths during the first control closer to a target current value.

10. The power converter apparatus according to claim 3,
wherein the switching circuit includes a chopper circuit including the third switching element, the conductive portion, and the choke coil, and
the control unit controls the chopper circuit to make a value of a current flowing through the pair of first conductive paths during the first control closer to a target current value.

11. The power converter apparatus according to claim 4,
wherein the switching circuit includes a chopper circuit including the third switching element, the conductive portion, and the choke coil, and
the control unit controls the chopper circuit to make a value of a current flowing through the pair of first conductive paths during the first control closer to a target current value.

12. The power converter apparatus according to claim 5,
wherein the switching circuit includes a chopper circuit including the third switching element, the conductive portion, and the choke coil, and
the control unit controls the chopper circuit to make a value of a current flowing through the pair of first conductive paths during the first control closer to a target current value.

* * * * *